Oct. 12, 1926.
A. G. HEILMAN
COVER FOR WHEEL TIRES
Filed July 10, 1924
1,602,488
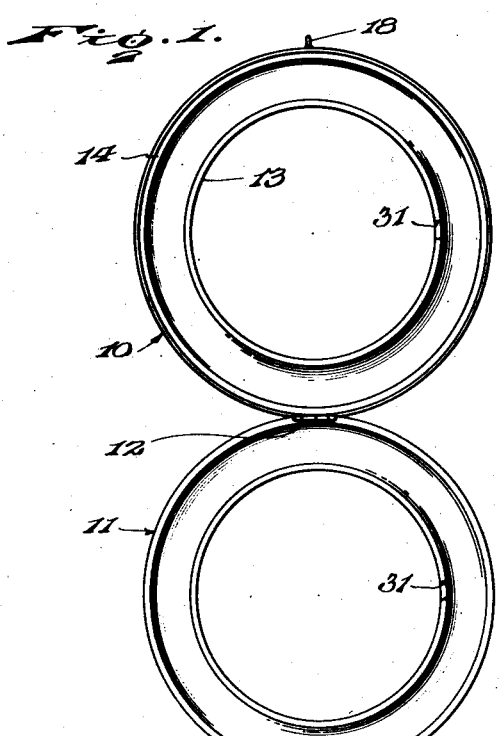
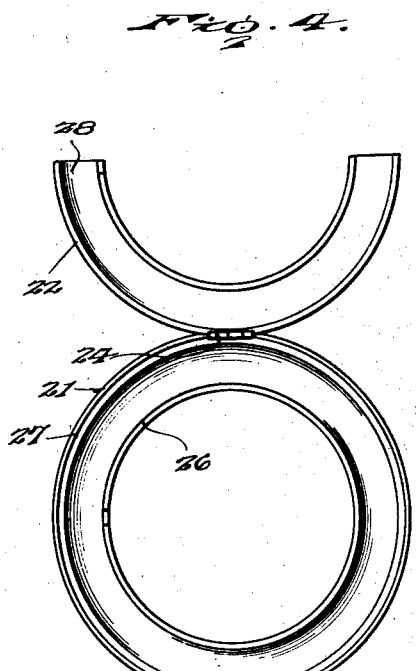
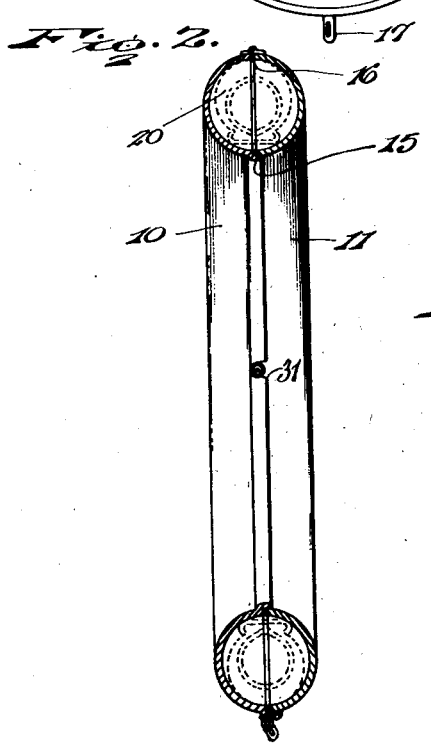
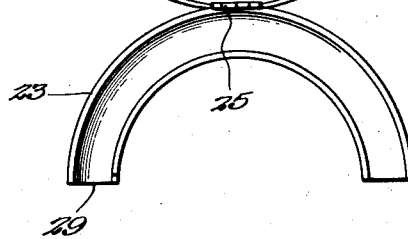
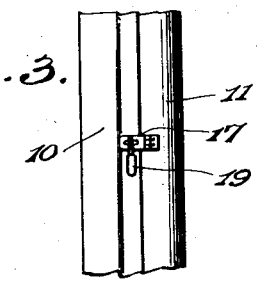
Inventor
A. G. Heilman.
By Lacy & Lacy, Attorneys Patented Oct. 12, 1926.

1,602,488

UNITED STATES PATENT OFFICE.

ARTHUR G. HEILMAN, OF MONTE VISTA, COLORADO.

COVER FOR WHEEL TIRES.

Application filed July 10, 1924. Serial No. 725,160.

The present invention relates to a metal cover adapted to hold a pneumatic tire and protect the same against injury from external sources.

One object of the invention is to provide such a cover made in two or more sections and of a size suitable to enclose a pneumatic tire so as to entirely exclude water from the tire and to prevent it being struck by objects from the outside.

In the accompanying drawing, the subject-matter of the present invention has been illustrated, and Figure 1 is a plan view of the cover open, Figure 2 is a diametrical section of the cover enclosing a pneumatic tire;

Figure 3 is a fragmentary side elevation of the cover indicating the manner of locking the same, and Figure 4 is a modification of the cover.

Referring first to Figures 1, 2 and 3, reference numeral 10 represents one-half of the cover, and 11 the mating half thereof. These two halves are preferably hinged together, as at 12, as best seen in Figure 2. Each half is of semi-circular cross section and forms an annular hollowed out member. The half portion 10 of the cover has its inner and outer edges provided with flanged seats 13 and 14, respectively, each adapted to receive a felt or rubber gasket 15 and 16. In this manner a tight joint is furnished between the peripheral edges of the cover when the half portion 11 thereof is closed down on the half portion 10.

On the points opposite to the hinge 12 the half portions are provided with a hasp 17 and eye 18 adapted to be engaged by the hasp and receive a padlock 19.

In Figure 2 is indicated the manner of placing a pneumatic tire 20 in the cover and it will be evident that the latter gives complete protection both from moisture and external blows when the cover is closed. As indicated in this figure the peripheral edges of the half portion 11 fit within the flanges of the seats 13 and 14 of the opposite portion 10 of the cover. In this manner the half portions are prevented from slipping sideways with relation to each other when the cover is closed. The flanges also assist in protecting the gaskets carried in the seats and in excluding the entry of water.

The cover is adapted to fit in the usual spare tire rack furnished on a vehicle and supplants all the parts of such a rack with the exception of the brackets.

In addition to keeping the tire dry, the gaskets also prevent rattling of the two half portions when closed.

The modified form of the invention illustrated in Figure 4 in which the inner half portion 21 is similar to the half portion 10 in the preferred construction. The outer half portion is, however, made in two sections 22 and 23, each hinged, as at 24 and 25, to the inner half portion 21 and at diametrically opposite points of its outer periphery.

Peripheral seats 26 and 27 are also provided in the inner half portion 21 as already described with relation to the half portion 10 in Figure 1 and suitable gaskets are placed in these seats. The sections 22 and 23 fold inwardly towards each other so that their ends 28 and 29 abut against each other along a diametrical line of the cover. The sections 22 and 23 are adapted to be locked to the inner half portion 21, as before, and the peripheral edges of the sections fit within the upturned edges of the seats 26 and 27.

This form of cover is intended for use on cars provided with rear bumpers and where a complete outer half portion 11 would be impractical as the bumper would not permit it to be swung open.

It is evident that in some cases it may be desirable to divide the outer half portion of the cover into more than two sections, which construction is also intended to be covered by the scope of the claims.

This metal cover can be manufactured at a very low cost and is preferably pressed in one operation out of sheet metal.

To give the best protection to a tire, the latter should be inflated, as shown in Figure 2 of the drawings, as the tire is well supported in this manner and will not rattle in the cover or become worn from constant scraping against the sides thereof.

Whether the cover is built in two or more sections provision is made for receiving the pneumatic valve. For this purpose the inner peripheral edges of the section have half circular notches 31 through which the valve stem projects when the tire and rim are placed in the cover.

Having thus described the invention, what is claimed as new is:

A tire receptacle comprising mating annular sections each of a concavo-convex formation and co-operating to form an annular tire receiving chamber of circular formation in cross section when said sections are in a closed position with their inner and outer peripheral edge portions contacting, one section having its peripheral edge portions offset outwardly to form right angularly disposed shoulders and flanges about the outer edges of the shoulders to extend in overlapping relation to the side walls of the other section, packing upon said shoulders for engagement by the peripheral edges of the other section to form tight joints between the sections, and means for releasably securing said sections in a closed position.

In testimony whereof I affix my signature.

ARTHUR G. HEILMAN. [L. S.]